United States Patent
Sugo (10) Patent No.: US 11,690,307 B2
(45) Date of Patent: Jul. 4, 2023

(54) ELECTRIFIED TRACTOR

(71) Applicant: TOYOTA JIDOSHA KABUSHIKI KAISHA, Aichi-ken (JP)

(72) Inventor: Yuki Sugo, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/864,399

(22) Filed: Jul. 14, 2022

(65) Prior Publication Data
US 2023/0040482 A1 Feb. 9, 2023

(30) Foreign Application Priority Data
Aug. 3, 2021 (JP) .................. 2021-127622

(51) Int. Cl.
| | | |
|---|---|---|
| B60L 50/60 | (2019.01) | |
| B60L 58/12 | (2019.01) | |
| A01B 69/04 | (2006.01) | |
| G07C 5/08 | (2006.01) | |
| B60L 1/00 | (2006.01) | |

(52) U.S. Cl.
CPC ........... *A01B 69/008* (2013.01); *B60L 1/003* (2013.01); *B60L 50/60* (2019.02); *B60L 58/12* (2019.02); *G07C 5/0825* (2013.01); *G07C 5/0833* (2013.01); *B60L 2240/545* (2013.01)

(58) Field of Classification Search
CPC .................................. B60L 50/60; B60L 58/12
USPC ........................................................ 307/10.1
See application file for complete search history.

(56) References Cited

U.S. PATENT DOCUMENTS

2019/0122454 A1   4/2019   Fukunaga et al.
2020/0298726 A1 *  9/2020   Satoh ...................... B60L 58/10

FOREIGN PATENT DOCUMENTS

| JP | 2014143965 A | 8/2014 | |
|---|---|---|---|
| JP | 2017204033 A | 11/2017 | |
| WO | WO-2015011534 A2 * | 1/2015 | ............. B60L 11/18 |

* cited by examiner

*Primary Examiner* — Daniel Kessie
*Assistant Examiner* — Dru M Parries
(74) *Attorney, Agent, or Firm* — Hauptman Ham, LLP (57) ABSTRACT

An electrified tractor includes a vehicle body, a working machine, an electric motor, a battery, an inverter that controls input-output electric power of the battery. The electrified tractor includes a control device that controls the inverter. The control device executes a restriction process, a charging rate calculation process and a relaxation process. In the restriction process, the control device controls the inverter such that the input and output of the battery is restricted within a prescribed electric power range, when a state of the battery satisfies a restriction condition. In the charging rate calculation process, the control device calculates a charging rate of the battery when it is assumed that a work is finished in a farming field, as an estimated charging rate. In the relaxation process, the control device expands the prescribed electric power range, when the estimated charging rate is higher than a first prescribed charging rate.

8 Claims, 6 Drawing Sheets

ELECTRIFIED TRACTOR

CROSS-REFERENCE TO RELATED APPLICATION

This application claims priority to Japanese Patent Application No. 2021-127622 filed on Aug. 3, 2021, incorporated herein by reference in its entirety.

BACKGROUND

1. Technical Field

The present disclosure relates to an electrified tractor.

2. Description of Related Art

An electrified tractor disclosed in Japanese Unexamined Patent Application Publication No. 2014-143965 (JP 2014-143965 A) includes a battery, an electric motor, wheels and a working machine. The battery supplies electric power to the electric motor. The electric motor is driven by the supply of the electric power from the battery. Drive power from the electric motor is transmitted to the wheels and the working machine. That is, the electrified tractor disclosed in JP 2014-143965 A travels using the electric motor as a drive source.

SUMMARY

A technology of restricting the output of the battery to equal to or lower than a constant value depending on the state of the battery is known as a technology for the electrified tractor disclosed in JP 2014-143965 A. Under the situation where the output of the battery is restricted, the traveling and working of the electrified tractor are restricted. Therefore, in the case where the output of the battery is restricted, after the restriction of the output, it is necessary to perform a work in a state where the working efficiency of the electrified tractor is low. As a result, there is fear that a long time is required to finish a work in a farm field or an intended work cannot be performed.

For solving the above problem, the present disclosure is an electrified tractor including: a vehicle body capable of being joined to a working machine; a working machine including a rotating body; a wheel for traveling, the wheel being attached to the vehicle body: an electric motor configured to drive at least one of the wheel and the rotating body; a battery configured to accumulate electric power that is supplied to the electric motor; an inverter configured to control input-output electric power of the battery; and a control device configured to control the inverter, in which: the control device executes a restriction process of controlling the inverter such that the input-output electric power of the battery is restricted within a previously set prescribed electric power range, when a state of the battery satisfies a previously set restriction condition; the control device executes a charging rate calculation process of calculating a charging rate of the battery when it is assumed that a work is finished in a previously set farm field, as an estimated charging rate; and the control device executes a relaxation process of expanding the prescribed electric power range, when the estimated charging rate calculated in the charging rate calculation process is higher than a previously set first prescribed charging rate.

In the above configuration, in the case where it is estimated that the charging rate of the battery when the work is finished in the farm field is higher than the first prescribed charging rate, the control device of the electrified tractor relaxes the restriction of the input-output electric power of the battery. Thereby, it is possible to restrain the occurrence of an affair in which the work needs to be continued in a state where the working efficiency of the electrified tractor is low or an intended work cannot be performed.

In the above configuration, when the estimated charging rate is lower than a second prescribed charging rate that is set to a higher value than the first prescribed charging rate, the control device may determine that the restriction condition is satisfied, and may execute the restriction process, in the electrified tractor. With the above configuration, it is possible to restrict the input and output of the electric power of the battery with the decrease in the charging rate of the battery. Accordingly, it is possible to restrain the battery from becoming an over discharge state.

In the above configuration, the control device may further execute a work determination process of determining what of a plurality of previously set work contents is a work content that is performed by the work machine, and in the charging rate calculation process, the control device may calculate the estimated charging rate depending on the work content determined in the work determination process, in the electrified tractor. With the above configuration, it is possible to cause the estimated charging rate to reflect the work content that is performed by the work machine. Therefore, it is possible to more exactly calculate the estimated charging rate.

In the above configuration, the electric motor may drive at least the rotating body, and when the charging rate of the battery is lower than the first prescribed charging rate, the control device may further execute a forced stop process of controlling the inverter so as to stop the drive of the rotating body, in the electrified tractor.

With the above configuration, it is possible to restrain the decrease in the charging rate of the battery, by stopping the drive of the rotating body of the working machine. Accordingly, it is possible to restrain another apparatus other than the working machine from being incapable of operating due to electric power shortage.

In the above configuration, the electrified tractor may further include an alarm device configured to give an alarm using at least one of sound and light, in which after the execution of the restriction process, the control device further executes a first notification process of causing the alarm device to give notice of information indicating that the charging rate of the battery is predicted to decrease. With the above configuration, an occupant of the electrified tractor can detect that there is a possibility that the charging rate of the battery decreases. Therefore, the occupant can perform traveling in conformity with the charging rate of the battery.

In the above configuration, the electrified tractor may further include an alarm device configured to give an alarm using at least one of sound and light, in which when the charging rate of the battery is lower than a second prescribed charging rate that is set to a higher value than the first prescribed charging rate, the control device further executes a second notification process of causing the alarm device to give notice of information indicating that there is a possibility that the work machine stops. With the above configuration, the occupant of the electrified tractor can detect that the charging rate of the battery decreases.

For solving the above problem, the present disclosure is an electrified tractor including: a vehicle body capable of being joined to a working machine; a working machine including a rotating body; a wheel for traveling, the wheel being attached to the vehicle body: an electric motor configured to drive at least one of the wheel and the rotating body; a battery configured to accumulate electric power that is supplied to the electric motor; an inverter configured to control input-output electric power of the battery; and a control device configured to control the inverter, in which: the control device executes a restriction process of controlling the inverter such that the input-output electric power of the battery is restricted within a previously set prescribed electric power range, when a state of the battery satisfies a previously set restriction condition; the control device executes a temperature calculation process of calculating a temperature of the battery when it is assumed that a work is finished in a previously set farm field, as an estimated temperature; and the control device executes a relaxation process of expanding the prescribed electric power range, when the estimated temperature calculated in the temperature calculation process is lower than a previously set first prescribed temperature.

In the above configuration, in the case where it is estimated that the temperature of the battery when the work is finished in the farm field is lower than the first prescribed temperature, the control device of the electrified tractor relaxes the restriction of the input-output electric power of the battery. Thereby, it is possible to restrain the occurrence of an affair in which the work needs to be continued in a state where the working efficiency of the electrified tractor is low or an intended work cannot be performed.

In the above configuration, when the estimated temperature is higher than a second prescribed temperature that is set to a lower value than the first prescribed temperature, the control device may determine that the restriction condition is satisfied, and may execute the restriction process, in the electrified tractor. With the above configuration, it is possible to restrict the input and output of the electric power of the battery with the rise in the temperature of the battery. Accordingly, it is possible to restrain the battery from becoming an over discharge state.

In the above configuration, the control device may further execute a work determination process of determining what of a plurality of previously set work contents is a work content that is performed by the work machine, and in the temperature calculation process, the control device may calculate the estimated temperature depending on the work content determined in the work determination process, in the electrified tractor. With the above configuration, it is possible to cause the estimated temperature to reflect the work content that is performed by the work machine. Therefore, it is possible to more exactly calculate the estimated temperature.

In the above configuration, the electric motor may drive at least the rotating body, and when the temperature of the battery is higher than the first prescribed temperature, the control device may further execute a forced stop process of controlling the inverter so as to stop the drive of the rotating body, in the electrified tractor.

With the above configuration, it is possible to restrain the temperature of the battery from excessively rising, by stopping the drive of the rotating body of the working machine. Accordingly, it is possible to restrain the battery from having a defect due to the rise in the temperature of the battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Overall Configuration of Electrified Tractor

Figure 1:
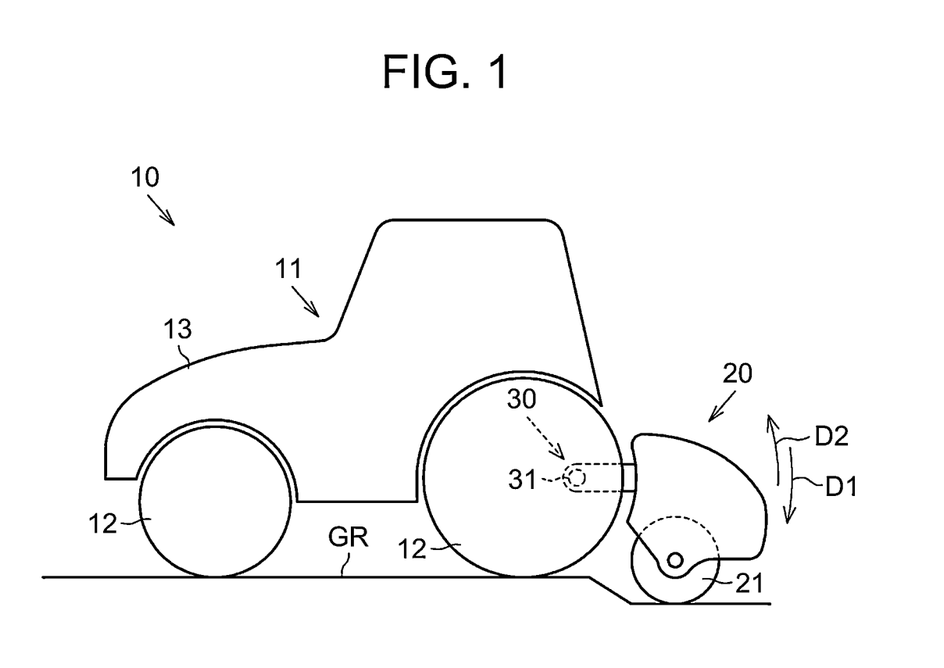
FIG. 1 is a schematic configuration diagram of an electrified tractor.

As shown in FIG. 1, an electrified tractor 10 includes a vehicle 11, a working machine 20 and a support mechanism 30. The vehicle 11 includes a plurality of wheels 12 and a vehicle body 13. The plurality of wheels 12 is joined to the vehicle body 13. The vehicle body 13 can be joined to the working machine 20 through the support mechanism 30.

The working machine 20 is positioned rearward of the vehicle 11. For example, the working machine 20 includes a plurality of blades 21 for tillage, as a rotating body. The working machine 20 can till a farm field, by rotating the blades 21 in a state where the blades 21 contact with a ground GR of the farm field. In FIG. 1, the plurality of blades 21 is illustrated as a columnar shape, for simplification. Although the blades 21 are exemplified as the working machine 20, the working machine 20 can be replaced with a working machine for fertilizer distribution, a working machine for rice transplanting or a working machine for border coating, for example. Each of these working machines includes a rotating body that rotates by dynamic power from a PTO 25 described later.

The support mechanism 30 joins the vehicle body 13 and the working machine 20. The support mechanism 30 includes a support shaft 31. Although not illustrated, the support mechanism 30 further includes a plurality of rods, a hydraulic circuit, a control valve, a hydraulic cylinder, and the like. In the support mechanism 30, the control valve and the like are opened and closed, so that the hydraulic cylinder operates. Thereby, the working machine 20 pivots about the support shaft 31. Specifically, in the working machine 20, the plurality of blades 21 pivots about the support shaft 31 in an approaching direction D1 or a separating direction D2. The approaching direction D1 is a direction in which the plurality of blades 21 approaches the ground GR. The separating direction D2 is a direction in which the plurality of blades 21 separates from the ground GR.

Dynamic Power Transmission Path of Electrified Tractor

Figure 2:
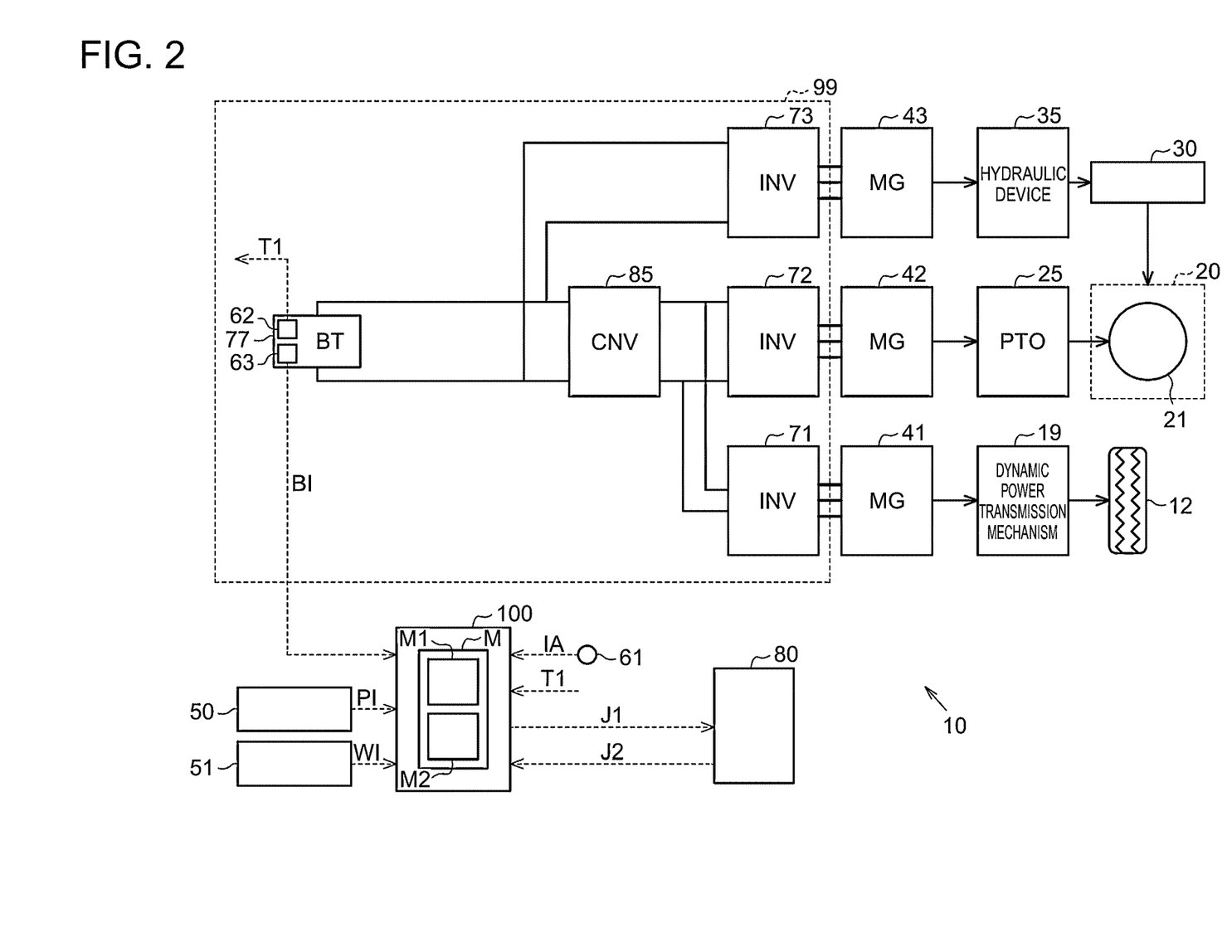
FIG. 2 is a diagram showing an electric configuration and dynamic power transmission path of the electrified tractor.

As shown FIG. 2, the electrified tractor 10 includes a first electric motor 41, a second electric motor 42, a third electric motor 43, a dynamic power transmission mechanism 19, a PTO 25 and a hydraulic device 35. Each of the first electric motor 41, the second electric motor 42 and the third electric motor 43 is a generator motor. The "PTO" is an abbreviation for "Power Take Off".

The first electric motor 41 is a drive source that causes the electrified tractor 10 to travel. The first electric motor 41 is joined to the wheel 12 through the dynamic power transmission mechanism 19. That is, the wheel 12 is a wheel for traveling that rotates by the drive power from the first electric motor 41. For example, the dynamic power transmission mechanism 19 includes a speed reduction mechanism that amplifies and outputs torque, and the like.

The second electric motor 42 is a drive source for the blades 21 of the working machine 20. The second electric motor 42 is joined to the blades 21 of the working machine 20 through the PTO 25. The PTO 25 is a device for transmitting the torque of the second electric motor 42 to the blades 21. For example, the PTO 25 includes a speed reduction mechanism and the like.

The third electric motor 43 is a drive source of the hydraulic device 35. The third electric motor 43 drives the hydraulic device 35. The hydraulic device 35 generates hydraulic pressure based on the drive power from the third electric motor 43. The hydraulic pressure generated by the hydraulic device 35 is supplied to the support mechanism 30. As described above, in the support mechanism 30, the working machine 20 can pivot in the approaching direction D1 or the separating direction D2, based on the supplied hydraulic pressure.

As described above, the first electric motor 41 is a generator motor. Therefore, the first electric motor 41 can function as an electric generator. Specifically, the first electric motor 41 can function as an electric generator, when the electrified tractor 10 decelerates. On that occasion, in the electrified tractor 10, regenerative braking power is generated depending on the amount of electric power generated by the first electric motor 41.

Electric Configuration of Electrified Tractor

As shown in FIG. 2, the electrified tractor 10 includes a power supply circuit 99. The power supply circuit 99 includes a battery 77, a converter 85, a first inverter 71, a second inverter 72 and a third inverter 73.

The battery 77 is a secondary battery. The battery 77 is a high-voltage battery for the traveling of the electrified tractor 10, the drive of the working machine 20 and the drive of the support mechanism 30. The battery 77 accumulates the electric power that is supplied to the first electric motor 41, the second electric motor 42 and the third electric motor 43. The converter 85 is connected to the battery 77. The converter 85 converts the voltage of the input electric power, and then outputs the electric power.

The first inverter 71 and the second inverter 72 are connected to the converter 85. The first inverter 71 and the second inverter 72 are connected to the converter 85 in parallel to each other. The first inverter 71 is connected to the first electric motor 41. The first inverter 71 performs AC-DC power conversion between the converter 85 and the first electric motor 41. The second inverter 72 is connected to the second electric motor 42. The second inverter 72 perform AC-DC power conversion between the converter 85 and the second electric motor 42.

The third inverter 73 is connected to the battery 77. The third inverter 73 is parallel to the converter 85. The third inverter 73 is connected to the third electric motor 43. The third inverter 73 performs AC-DC power conversion between the battery 77 and the third electric motor 43.

The electrified tractor 10 includes an acceleration sensor 61, a battery temperature sensor 62 and a current-voltage sensor 63. The acceleration sensor 61 is positioned in the vehicle body 13 of the electrified tractor 10. The acceleration sensor 61 detects an acceleration IA that is generated in the vehicle body 13. The acceleration IA is a vector value, and includes information relevant to orientation. Gravity acceleration is applied to the electrified tractor 10. Accordingly, the acceleration sensor 61 functions also as an inclination sensor that detects the inclination of the vehicle body 13.

The battery temperature sensor 62 is built in the battery 77. The battery temperature sensor 62 detects a temperature T1 of the battery 77. The current-voltage sensor 63 detects the voltage of the battery 77 and the current from the battery 77, as battery information BI.

Schematic Configuration of Control Device and Others

The electrified tractor 10 includes a control device 100, a display 80, a GPS device 50 and a wireless communication device 51.

The display 80 is attached in a vehicle cabin of the vehicle body 13. The vehicle cabin is a space in which the occupant gets when the occupant drives the electrified tractor 10. The display 80 can display a variety of information. Further, the display 80, in which a touch panel is built, accepts an input from the occupant. Accordingly, the occupant can input information to the electrified tractor 10 through the display 80. The display 80 is a kind of alarm device that gives an alarm using at least one of sound and light.

The GPS device 50 is attached to the vehicle body 13. The GPS device 50 receives signals relevant to current position information PI about the electrified tractor 10, from GPS satellites.

The wireless communication device 51 is attached to the vehicle body 13. The wireless communication device 51 can communicate with an unillustrated weather server through a wireless communication network. The wireless communication device 51 receives weather information WI corresponding to the current position identified by the position information PI. The weather information WI includes information indicating that precipitation occurs or precipitation does not occur.

The control device 100 controls the first inverter 71, the second inverter 72, the third inverter 73, and the like. By controlling the first inverter 71, the control device 100 causes the electrified tractor 10 to travel or causes the electrified tractor 10 to stop traveling. Further, by controlling the second inverter 72, the control device 100 operates or stops the blades 21 of the working machine 20. That is, the control device 100 controls the input-output electric power of the battery 77 through the control of the first inverter 71 and the second inverter 72.

The control device 100 controls the display 80. The control device 100 outputs a display signal J1 for causing the display 80 to display a variety of information, to the display 80. The display 80 receives the display signal J1, and displays a content corresponding to the display signal J1. In the case where the occupant performs the input using the display 80, the control device 100 receives information J2 input by the occupant through the display 80.

The control device 100 acquires a signal indicating the acceleration IA of the vehicle body 13, from the acceleration sensor 61. The control device 100 acquires a signal indicating the temperature T1 of the battery 77, from the battery temperature sensor 62. The control device 100 acquires a signal indicating the battery information BI, from the current-voltage sensor 63. As described above, the battery information BI includes the information about the voltage and current of the battery 77. The control device 100 receives a signal relevant to the position information PI, through the GPS device 50. The control device 100 repeatedly acquires the signals from the sensors every unit time.

The control device 100 requests the weather information WI about the current position to the unillustrated weather server through the wireless communication device 51. The control device 100 receives the weather information WI sent in response to the request, through the wireless communication device 51.

The control device 100 stores an electric power amount map M. The electric power amount map M is a map that is generated and updated by an estimated electric power consumption calculation control described later. A plurality of work contents that can be executed by the electrified tractor 10 is stored in the electric power amount map M. For example, the plurality of work contents include tillage, fertilizer distribution, rice transplanting and border coating. The electric power amount map M indicates an estimated electric power consumption for each work content. The estimated electric power consumption is an estimated value of the electric power amount of the battery 77 that is consumed until the electrified tractor 10 finishes a work in a previously set farm field.

Further, the control device 100 stores the electric power amount map M corresponding to the weather information WI. As the electric power amount M, the control device 100 stores a first electric power amount map M1 that is used in the case where precipitation does not occur and a second electric power amount map M2 that is used in the case where precipitation occurs. The kinds of the stored work contents are common between the first electric power amount map M1 and the second electric power amount map M2.

The control device 100 can be configured as one or more processors that execute various processes in accordance with computer programs (software). The control device 100 may be configured as one or more dedicated hardware circuits that execute at least some processes of the various processes, as exemplified by an application specific integrated circuit (ASIC), or as a circuit (circuitry) that includes a combination of dedicated hardware circuits. Each processor includes a CPU, and a memory such as a RAM and a ROM. The memory contains program codes or commands that are configured to cause the CPU to execute processes. Examples of the memory, that is, the computer-readable medium, include all media that can be accessed and used by general-purpose or dedicated computers. The control device 100 includes a storage device that is an electrically rewritable non-volatile memory. In the storage device that is a non-volatile memory, the control device 100 stores programs for executing the estimated electric power consumption calculation control, a farm-field exit electric power calculation control and an input-output restriction control described later.

Estimated Electric Power Consumption Calculation Control

The control device 100 starts the estimated electric power consumption calculation control when the electrified tractor 10 enters the farm field from the outside of the farm field. That is, the control device 100 acquires the current position information PI about the electrified tractor 10, from the GPS device 50. Further, based on the acquired position information PI, the control device 100 determines whether the current position of the electrified tractor 10 is inside a previously input region of the farm field. Then, the control device 100 executes the estimated electric power consumption calculation control, on condition that the previous position information PI is outside the region of the farm field and the current position information PI is inside the region of the farm field. The region of the farm field is stored in the control device 100 in advance, for example, by the input by the occupant using the display 80.

Figure 3:
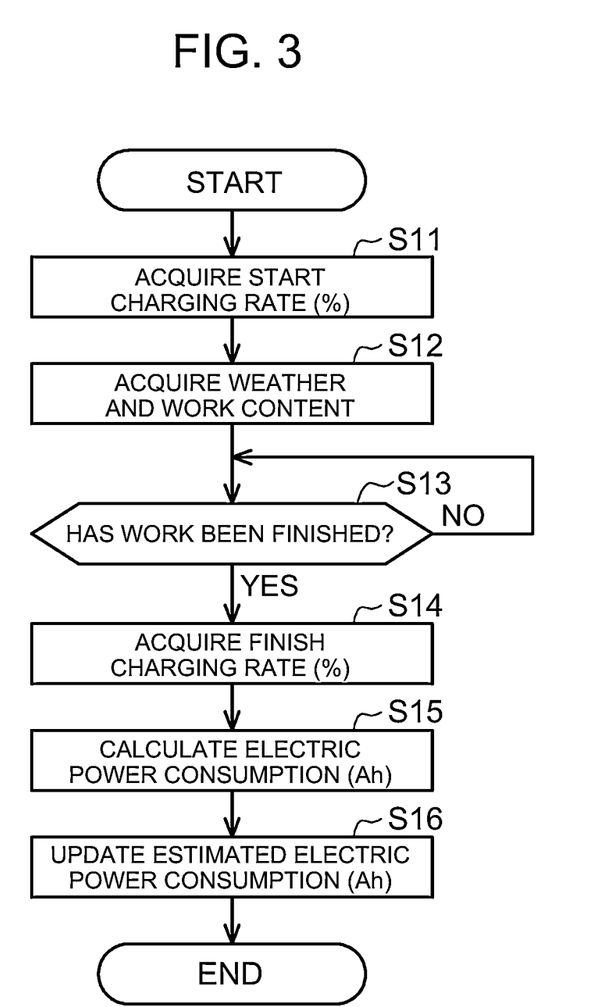
FIG. 3 is a flowchart of an estimated electric power consumption calculation control that is executed by a control device of an electrified tractor in a first embodiment.

As shown in FIG. 3, when the control device 100 starts the estimated electric power consumption calculation control, the control device 100 first executes the process of step S11. In step S11, the control device 100 acquires, as a start charging rate, the current charging rate of the battery 77, that is, as the charging rate at the time point when the electrified tractor 10 starts the work in the farm field. Specifically, the control device 100 acquires the battery information BI from the battery 77. Further, the control device 100 acquires the temperature T1 from the battery temperature sensor 62. The control device 100 calculates the start charging rate based on the battery information BI and the temperature T1. The charging rate is the rate of the electric power amount accumulated in the battery 77 to the electric power amount in the full charging state of the battery 77, and is expressed in percentage, for example. Thereafter, the process in the control device 100 transitions to step S12.

In step S12, the control device 100 acquires a work content that is executed by the electrified tractor 10 from now. Specifically, first, the control device 100 outputs the display signal J1 to the display 80, and causes the display 80 to start the display of a message. The content of the message includes information for prompting the occupant to select a work content corresponding to the work that is executed from now. Then, the control device 100 receives the information J2 about the work content selected by the occupant, through the display 80.

Further, in step S12, the control device 100 requests the weather information WI corresponding to the current position of the electrified tractor 10, to the weather server, through the wireless communication device 51. Then, the control device 100 receives the weather information WI through the wireless communication device 51. The control device 100 determines whether or not precipitation occurs, based on the received weather information WI. Thereafter, the process in the control device 100 transitions to step S13.

In step S13, the control device 100 determines whether the electrified tractor 10 has finished the work. Specifically, the control device 100 determines that the electrified tractor 10 has finished the work, in the case where the traveling distance of the electrified tractor 10 is equal to or longer than a previously set prescribed distance and where the second inverter 72 is not driving the second electric motor 42. The above prescribed distance is previously set as a traveling distance that is required until the electrified tractor 10 finishes the work in the farm field in the case of traveling while performing the work in the farm field. In the case of the negative determination in step S13 (S13: NO), the control device 100 executes the process of step S13 again. In the case of the positive determination in step S13 (S13: YES), the process in the control device 100 transitions to step S14.

In step S14, the control device 100 acquires the charging rate of the battery 77 at the time of the execution of step S14, that is, the charging rate at the time point when the electrified tractor 10 finishes the work in the farm field, as a finish charging rate. Specifically, similarly to step S11, the control device 100 acquires the battery information BI and the temperature T1. Then, the control device 100 calculates the finish charging rate based on the battery information BI and the temperature T1. Thereafter, the process in the control device 100 transitions to step S15.

In step S15, the control device 100 calculates an electric power consumption that is an electric power amount consumed by the work, based on the start charging rate and the finish charging rate. Specifically, the control device 100 calculates the consumed charging rate of the battery 77, by subtracting the finish charging rate from the start charging rate. Then, the control device 100 calculates the electric power consumption by converting the consumed charging rate of the battery 77 into an electric power amount (Ah). Thereafter, the process in the control device 100 transitions to step S16.

In step S16, first, the control device 100 identifies the electric power amount map M that needs to be updated. Specifically, when the weather information WI acquired in step S12 includes the information indicating that precipitation does not occur, the control device 100 identifies the first electric power amount map M1. When the weather information WI acquired in step S12 includes the information indicating that precipitation occurs, the control device 100 identifies the second electric power amount map M2. Then, in the electric power amount map M that is referred to, the control device 100 refers to the estimated electric power consumption corresponding to the information J2 about the work content acquired in step S12.

Next, the control device 100 calculates a new estimated electric power consumption. The new estimated electric power consumption is calculated from the following expression, using a reflection rate $\alpha$. The reflection rate $\alpha$ is a previously set fixed value that is larger than zero and is equal to or smaller than one.

(New Estimated Electric Power Consumption)=(Estimated Electric Power Consumption)+(Reflection Rate $\alpha$)×(Electric Power Consumption−Estimated Electric Power Consumption)

Then, in the electric power amount map M that is referred to, the control device 100 updates the estimated electric power consumption corresponding to the above-described work content, to the new estimated electric power consumption. Thereafter, the estimated electric power consumption calculation control by the control device 100 ends.

Farm-Field Exit Electric Power Calculation Control

The control device 100 starts the farm-field exit electric power calculation control when the electrified tractor 10 enters the farm field from the outside of the farm field. The control device 100 can execute the processes of the farm-field exit electric power calculation control, parallel to the processes of the estimated electric power consumption calculation control.

Figure 4:
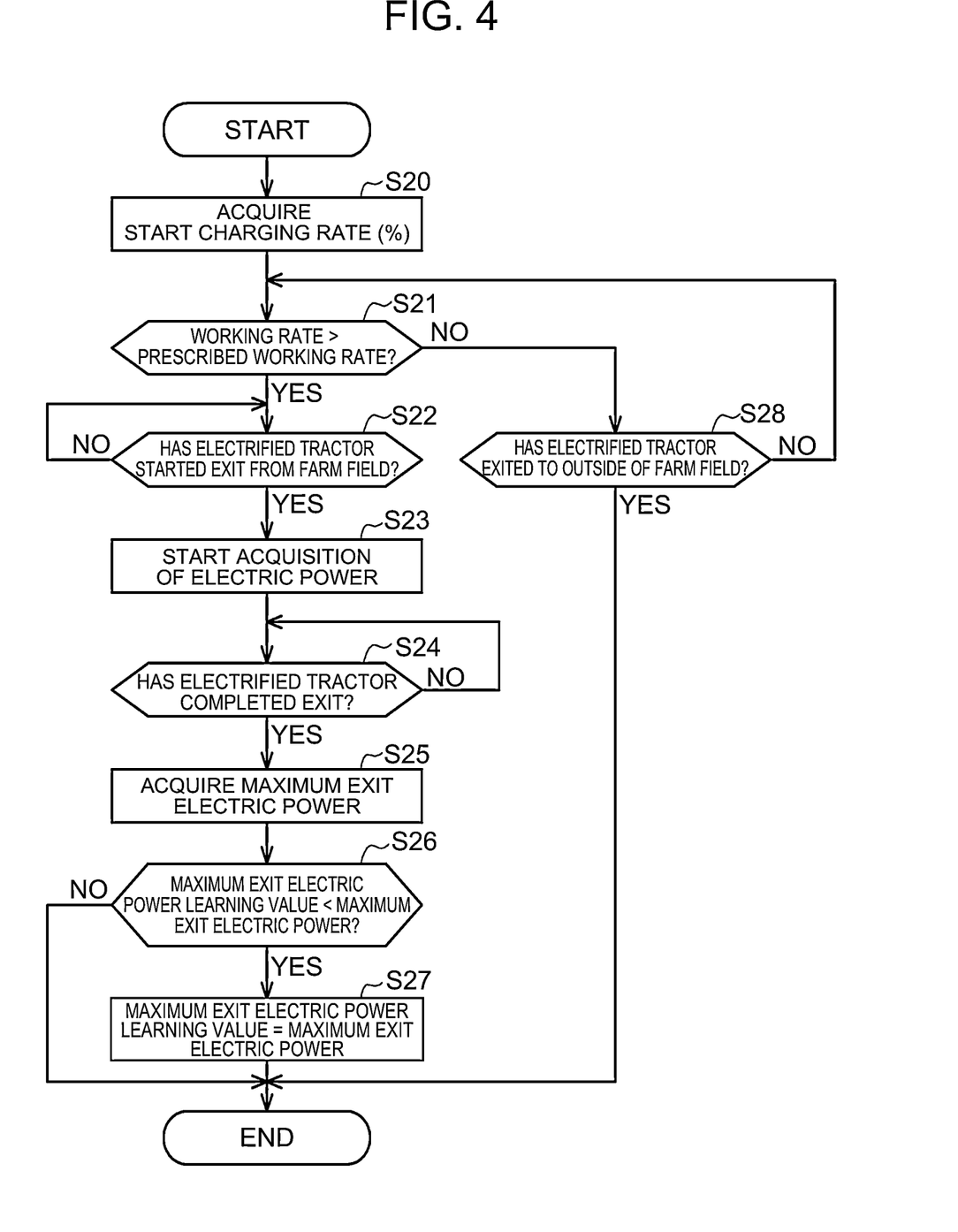
FIG. 4 is a flowchart of a farm-field exit electric power calculation control that is executed by the control device of the electrified tractor in the first embodiment.

When the farm-field exit electric power calculation control starts, first, the control device 100 executes the process of step S20, as shown in FIG. 4. In step S20, the control device 100 acquires the start charging rate, similarly to the above-described step S11. That is, the control device 100 calculates the start charging rate, based on the battery information BI and the temperature T1. Thereafter, the process in the control device 100 transition to step S21.

In step S21, first, the control device 100 calculates a working rate. Specifically, the control device 100 acquires the charging rate of the battery 77 at the time point of the process of step S21. Specifically, the control device 100 acquires the battery information BI from the battery 77. Further, the control device 100 acquires the temperature T1 from the battery temperature sensor 62. The control device 100 calculates the charging rate of the battery 77 based on the battery information BI and the temperature T1. Next, the control device 100 calculates a consumed charging rate, by subtracting the charging rate of the battery 77 at the time point of the process of step S21, from the start charging rate. Further, the control device 100 calculates the charging rate required for the completion of the work, by converting the estimated electric power consumption into the charging rate of the battery 77. Then, as the working rate, the control device 100 calculates the ratio of the consumed charging rate to the charging rate required for the completion of the work.

Then, the control device 100 determines whether the working rate is higher than a previously set prescribed working rate. The prescribed working rate is set to such a value that the work in the farm field can be regarded as being finished or as being almost finished, at the time point of step S21. For example, the prescribed working rate is set to a value equal to or higher than 90%. In the case of the negative determination in step S21 (S21: NO), the process in the control device 100 transitions to step S28.

In step S28, the control device 100 determines whether the electrified tractor 10 has exited from the inside of the farm field to the outside of the farm field. Specifically, in the case where the previous position information PI is inside the region of the farm field and where the current position information PI is outside the region of the farm field, the control device 100 determines that the electrified tractor 10 has exited to the outside of the farm field. In the case of the positive determination in step S28 (S28: YES), the farm-field exit electric power calculation control by the control device 100 ends. In the case of the negative determination in step S28 (S28: NO), the control device 100 performs the process of step S21 again.

On the other hand, in the case of the positive determination in step S21 (S21: YES), the process in the control device 100 transitions to step S22. In step S22, the control device 100 determines whether the electrified tractor 10 has started the exit from the farm field. Specifically, the control device 100 acquires the acceleration IA from the acceleration sensor 61. Then, the control device 100 calculates the inclination of the vehicle body 13 based on the acceleration IA. The inclination of the vehicle body 13 means an acute angle of angles between a top-bottom axis of the vehicle body 13 and a vertical axis extending in the gravity direction. Accordingly, when the electrified tractor 10 travels on a horizontal surface, the inclination of the vehicle body 13 is zero. The control device 100 determines whether a state where the inclination of the vehicle body 13 is larger than a previously set prescribed angle has been continued for a previously set prescribed period or longer. In the case of the positive determination, the control device 100 determines that the electrified tractor 10 has started the exit from the farm field. An example of the above prescribed period is several seconds.

In the case of the negative determination in step S22 (S22: NO), the control device 100 executes the process of step S22 again. In the case of the positive determination in step S22 (S22: YES), the process in the control device 100 transitions to step S23.

In step S23, the control device 100 starts the acquisition of the electric power of the battery 77. That is, the control device 100 acquires the battery information BI every unit time. The control device 100 calculates the electric power (W) of the battery 77 for every unit time, based on the battery information BI. The control device 100 may acquire the battery information BI at an interval of a time shorter than the unit time, and may calculate an average electric power in the unit time, as the output electric power of the battery 77 for every unit time. From the process of step S23, the control device 100 calculates the output electric power of the battery 77 every unit time. Thereafter, the process in the control device 100 transitions to step S24.

In step S24, the control device 100 determines whether the electrified tractor 10 has completed the exit from the farm field. Specifically, the control device 100 acquires the acceleration IA from the acceleration sensor 61. The control device 100 determines whether a state where the inclination of the vehicle body 13 is equal to or smaller than the above-described prescribed angle has been continued for a certain period. In the case of the positive determination, the control device 100 determines that the electrified tractor 10 has completed the exit from the farm field. An example of the above prescribed period is several seconds.

In the case of the negative determination in step S24 (S24: NO), the control device 100 executes the process of step S24 again. On the other hand, in the case of the positive determination in step S24 (S24: YES), the control device 100 finishes the acquisition of the electric power. Then, the process in the control device 100 transitions to step S25.

In step S25, the control device 100 acquires and stores the maximum value of the values that are values of the output electric power for every unit time and that are calculated from the start of step S23, as a maximum exit electric power. Thereafter, the process in the control device 100 transitions to step S26.

In step S26, the control device 100 determines whether the maximum exit electric power decided in step S25 is higher than a maximum exit electric power learning value stored by the control device 100. The maximum exit electric power learning value is a value that is decided in the previous farm-field exit electric power calculation control and that is stored by the control device 100. In the case where the maximum exit electric power learning value is not stored, the control device 100 regards the maximum exit electric power learning value as zero.

In the case of the negative determination in step S26 (S26: NO), the farm-field exit electric power calculation control by the control device 100 ends. On the other hand, in the case of the positive determination in step S26 (S26: YES), the process in the control device 100 transitions to step S27.

In step S27, the control device 100 stores the maximum exit electric power acquired in step S25, as the maximum exit electric power learning value. That is, the control device 100 updates the maximum exit electric power learning value. Then, the farm-field exit electric power calculation control by the control device 100 ends.

Input-Output Restriction Control

The control device 100 starts the input-output restriction control when the electrified tractor 10 enters the farm field from the outside of the farm field. The control device 100 can execute the processes of the input-output restriction control, parallel to the processes of the farm-field exit electric power calculation control and the processes of the estimated electric power consumption calculation control.

Figure 5:
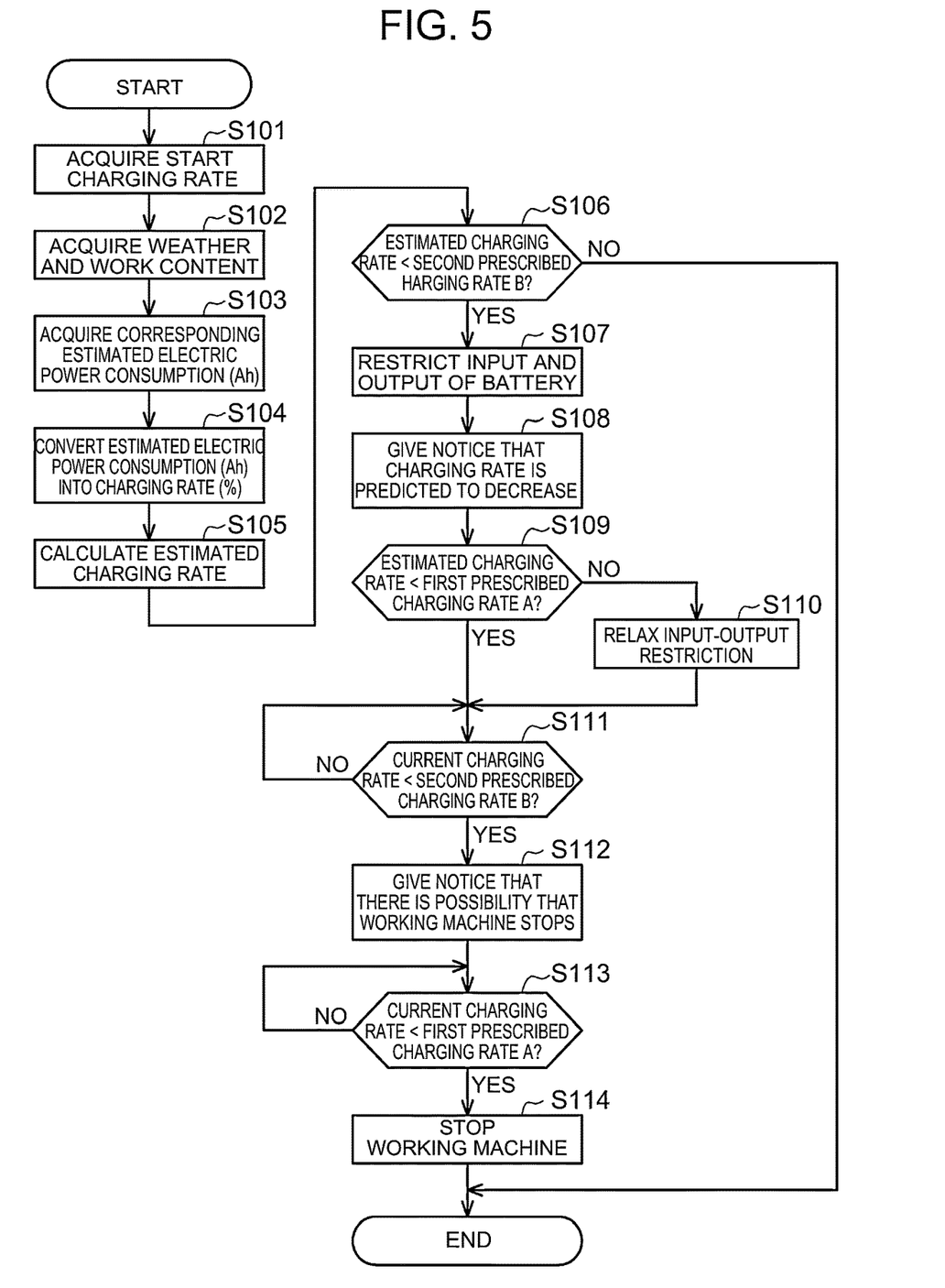
FIG. 5 is a flowchart of an input-output restriction control that is executed by the control device of the electrified tractor in the first embodiment.

As shown in FIG. 5, when the input-output restriction control starts, first, the control device 100 executes the process of step S101. In step S101, the control device 100 acquires the start charging rate, similarly to the above-described step S11. That is, the control device 100 calculates the start charging rate based on the battery information BI and the temperature T1. Thereafter, the process in the control device 100 transitions to step S102.

In step S102, the control device 100 acquires the work content that is executed by the electrified tractor 10 from now, similarly to the above-described step S12. Further, in step S102, the control device 100 receives the weather information WI, similarly to the above-described step S12. The control device 100 determines whether or not precipitation occurs, based on the received weather information WI. Step S102 is a work determination process of determining what of a plurality of previously set work contents is the work content that is performed by the working machine 20. Thereafter, the process in the control device 100 transitions to step S103.

In step S103, the control device 100 refers to the electric power amount map M corresponding to the weather information WI, similarly to step S16. That is, the control device 100 refers to the first electric power amount map M1 or the second electric power amount map M2. Then, in the electric power amount map M that is referred to, the control device 100 refers to the estimated electric power consumption corresponding to the acquired work content. Thereafter, the process in the control device 100 transitions to step S104.

In step S104, the control device 100 converts the estimated electric power consumption into the charging rate. Specifically, as the charging rate, the control device 100 calculates the rate of the estimated electric power consumption to the electric power amount of the battery 77 in the full charging state. Thereafter, the process in the control device 100 transitions to step S105.

In step S105, the control device 100 calculates the estimated charging rate that is the charging rate of the battery 77 when it is assumed that the electrified tractor 10 has finished the work in the farm field. Specifically, the control device 100 calculates the estimated charging rate, by subtracting the charging rate corresponding to the estimated electric power consumption from the start charging rate. The process of step S105 is a charging rate calculation process. Thereafter, the process in the control device 100 transitions to step S106.

In step S106, the control device 100 determines whether the estimated charging rate calculated in the charging rate calculation process is lower than a previously set second prescribed charging rate B. The second prescribed charging rate B is set as the lower limit of the charging rate at which the battery 77 does not deteriorate. Further, the second prescribed charging rate B is set to a fixed value that is higher than a first prescribed charging rate A described later. The control device 100 previously stores the second prescribed charging rate B.

In the case of the negative determination in step S106 (S106: NO), the input-output restriction control by the control device 100 ends. On the other hand, in the case of the positive determination in step S106 (S106: YES), the process in the control device 100 transitions to step S107.

In step S107, the control device 100 controls the first inverter 71 and the second inverter 72, such that the input-output electric power of the battery 77 is within a previously set prescribed electric power range. The prescribed electric power range is set as a narrower range than an electric power range that can be input or output and that is set before the execution of the process. For example, the prescribed electric power range is set as an electric power that allows the vehicle body 13 to travel at a low speed of three kilometers per hour, for example, while the blades 21 of the working machine 20 operate at a minimal rotation speed. The process of step S106 and step S107 is a restriction process of controlling the first inverter 71 and the second inverter 72 such that the input-output electric power of the battery 77 is restricted within the prescribed electric power range when the state of the battery 77 satisfies a restriction condition. That is, the restriction condition is a condition that the estimated charging rate is lower than the second prescribed charging rate B. Thereafter, the process in the control device 100 transitions to step S108.

In step S108, the control device 100 causes the display 80 to start the display of a message. The content of the message includes information indicating that the charging rate of the battery 77 is predicted to decrease. The process of step S108 is a first notification process. Thereafter, the process in the control device 100 transitions to step S109.

In step S109, the control device 100 determines whether the estimated charging rate calculated in the charging rate calculation process is lower than the first prescribed charging rate A, which is previously set. The first prescribed charging rate A is set as the lower limit of the charging rate at which the above-described maximum exit electric power learning value can be output. The control device 100 stores a map indicating the relation between the charging rate of the battery 77 and the electric power that can be output by the battery 77. The control device 100 refers to the map, and calculates the first prescribed charging rate A corresponding to the maximum exit electric power learning value. In this way, the first prescribed charging rate A is a variable value, and the above-described second prescribed charging rate B is set as a higher value than the entire range of the first prescribed charging rate A.

In the case of the positive determination in step S109 (S109: YES), the process in the control device 100 transitions to step S111. In the case of the negative determination in step S109 (S109: NO), the process in the control device 100 transitions to step S110.

In step S110, the control device 100 expands the prescribed electric power range provided in the restriction process. Specifically, the control device 100 sets the prescribed electric power range to the same electric power range as an electric power range at the time of normal traveling before the prescribed electric power range is provided. That is, although the restriction process is being executed, the control device 100 temporarily relaxes the restriction, to change the electric power range that can be input and output by the battery 77 to the same electric power range as the electric power range at the time of the normal traveling. Namely, the process of step S110 is a relaxation process of expanding the prescribed electric power range. Thereafter, the process in the control device 100 transitions to step S111.

In step S111, the control device 100 determines whether a current charging rate that is the charging rate of the battery 77 at the current time is lower than the second prescribed charging rate B. Specifically, the control device 100 acquires the battery information BI and the temperature T1, similarly to the above-described step S11. Then, the control device 100 calculates the current charging rate based on the battery information BI and the temperature T1. Furthermore, the control device 100 compares the current charging rate and the second prescribed charging rate B, and thereby performs the above determination.

In the case of the negative determination in step S111 (S111: NO), the control device 100 executes the process of step S111 again. In the case of the positive determination in step S111 (S111: YES), the process in the control device 100 transitions to step S112.

In step S112, the control device 100 causes the display 80 to start the display of a message. The content of the message includes information indicating that there is a possibility that the working machine 20 stops. The process of step S112 is a second notification process. Thereafter, the process of the control device 100 transitions to step S113.

In step S113, the control device 100 determines whether the current charging rate that is the charging rate of the battery 77 at the current time is lower than the first prescribed charging rate A. Specifically, the control device 100 acquires the battery information BI and the temperature T1 again, similarly to the above-described step S11. Then, the control device 100 calculates the current charging rate based on the battery information BI and the temperature T1. Furthermore, the control device 100 compares the current charging rate and the first prescribed charging rate A, and thereby performs the above determination.

In the case of the negative determination in step S113 (S113: NO), the control device 100 executes the process of step S113 again. In the case of the positive determination in step S113 (S113: YES), the process in the control device 100 transitions to step S114.

In step S114, the control device 100 controls the second inverter 72 so as to stop the drive of the blades 21 in the working machine 20. That is, the control device 100 stops the output of the second electric motor 42 by controlling the second inverter 72. The process of step S114 is a forced stop process. Thereafter, the control device 100 ends a sequence of input-output restriction control.

Operation of First Embodiment

In the first embodiment, suppose that it is determined that the estimated charging rate at the time of the finish of the work is lower than the second prescribed charging rate B. In this case, the control device 100 restricts the input-output electric power to the prescribed electric power range, such that the charging rate of the battery 77 does not decrease rapidly in a short time. That is, in this situation, the traveling speed of the electrified tractor 10 is restricted, or the rotation speed of the PTO 25 is decreased.

Meanwhile, suppose that the estimated charging rate is lower than the second prescribed charging rate B and is higher than the first prescribed charging rate A. In this case, the control device 100 temporarily relaxes the restriction, to change the electric power range that can be input and output by the battery 77 to the same electric power range as the electric power range at the time of the normal traveling. That is, the electrified tractor 10 can operate similarly to the normal traveling.

Effect of First Embodiment (1-1) In the above embodiment, in the case where the charging rate of the battery 77 when the work is finished in the farm field is expected to be higher than the first prescribed charging rate A, the control device 100 relaxes the input-output electric power restriction of the battery 77 that is provided in the restriction process. Thereby, it is possible to restrain the occurrence of an affair in which the work needs to be continued in a state where the working efficiency of the electrified tractor 10 is low or an intended work cannot be performed. Even in this case, the charging rate of the battery 77 when the work is finished is likely to be higher than the first prescribed charging rate A, and therefore the charging rate of the battery 77 is avoided from becoming excessively low.

(1-2) In the above embodiment, in the case where the estimated charging rate is lower than the second prescribed charging rate B, the control device 100 executes the restriction process. Thereby, it is possible to restrict the input and output of the electric power of the battery 77, with the decrease in the charging rate of the battery 77. Accordingly, it is possible to restrain the battery 77 from becoming an over discharge state.

(1-3) The charging rate of the battery 77 that is consumed varies depending on the work content that is performed by the working machine 20. In the above embodiment, the control device 100 calculates the estimated charging rate depending on the work content determined in the work determination process. With this configuration, it is possible to reflect the work content that is performed by the working machine 20, in the calculation of the estimated charging rate. Therefore, it is possible to more exactly calculate the estimated charging rate.

(1-4) In the above configuration, in the case where the current charging rate of the battery 77 is lower than the first prescribed charging rate A, the control device 100 forcedly stops the drive of the working machine 20. With this configuration, by stopping the drive of the working machine 20, it is possible to secure the electric power of the battery 77 that is necessary for the traveling of the electrified tractor 10. Accordingly, it is possible to restrain the electrified tractor 10 from stopping in the farm field due to electric power shortage.

(1-5) In the above configuration, the control device 100 executes the first notification process through the display 80. With this configuration, the occupant of the electrified tractor 10 can detect that there is a possibility that the charging rate of the battery 77 decreases. Therefore, the occupant can perform the traveling in conformity with the charging rate of the battery 77. Further, the occupant can take a measure against the predicted decrease in the charging rate of the battery 77, and for example, can charge the battery 77.

(1-6) In the above embodiment, the first prescribed charging rate A is the lower limit of the charging rate at which the maximum exit electric power learning value can be output. In the case where the estimated charging rate is lower than the first prescribed charging rate A in the input-output restriction control, the control device 100 does not execute the relaxation process. That is, by continuing to execute the input-output restriction, the control device 100 can avoid the charging rate of the battery 77 at the time point when the working machine 20 finishes the work, from falling below the charging rate of the battery 77 that is necessary for the exit from the farm field.

(1-7) In the above embodiment, the control device 100 executes the second notification process through the display 80. With this configuration, the occupant of the electrified tractor 10 can detect the decrease in the charging rate of the battery 77.

(1-8) The muddy condition of the farm field is different between the case where precipitation occurs and the case where precipitation does not occur. For example, in the case where precipitation occurs, the degree of the mud of the farm field is larger and the number of muddy spots is larger, than in the case where precipitation does not occur. In the above embodiment, at the time of the acquisition of the estimated electric power consumption, the control device 100 can selectively refer to the first electric power amount map M1 or the second electric power amount map M2. That is, the control device 100 can execute the estimated electric power consumption calculation control, based on the electric power amount map M that more appropriately indicates the actual condition of the farm field.

(1-9) In the above embodiment, the control device 100 executes the estimated electric power consumption calculation control. Thereby, the control device 100 updates the estimated electric power consumption in the electric power amount map M. With this configuration, the control device 100 can hold the electric power amount map M that reflects the actual condition of the farm field.

(1-10) In the above embodiment, the control device 100 executes the farm-field exit electric power calculation control. Thereby, the control device 100 updates the maximum exit electric power learning value. With this configuration, the control device 100 can store the exit electric power that reflects the actual condition of the farm field.

Second Embodiment

A second embodiment of the electrified tractor 10 will be described below. The schematic configuration, electric configuration and dynamic power transmission path of the electrified tractor 10 are the same as those in the first embodiment. An input-output restriction control that is executed by the control device 100 of the electrified tractor 10 in the second embodiment will be described below.

Input-Output Restriction Control

The control device 100 starts the input-output restriction control when the electrified tractor 10 enters the farm field from the outside of the farm field. The control device 100 can execute the processes of the input-output restriction control, parallel to the processes of the farm-field exit electric power calculation control and the processes of the estimated electric power consumption calculation control.

Figure 6:
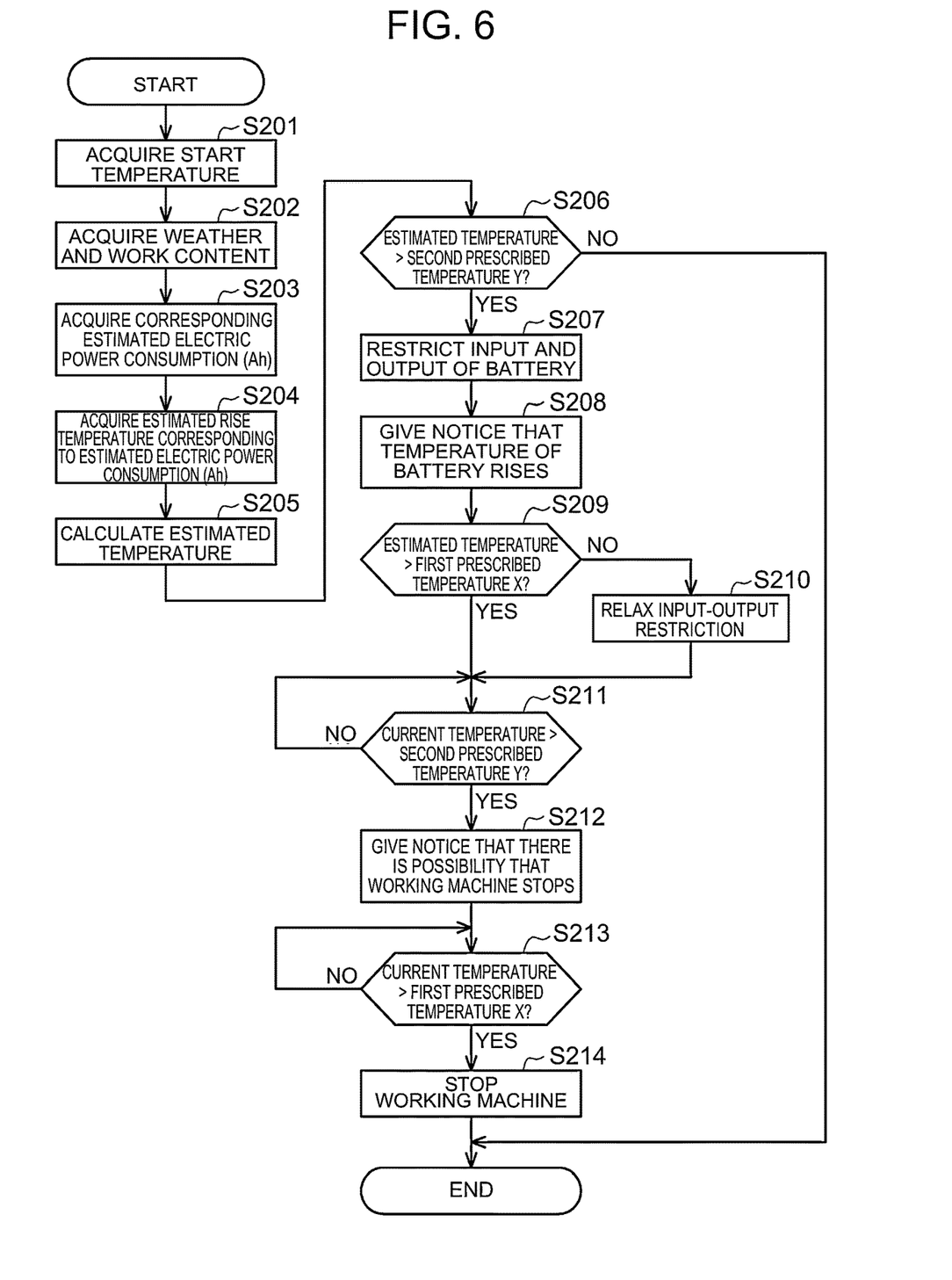
FIG. 6 is a flowchart of an input-output restriction control that is executed by a control device of an electrified tractor in a second embodiment.

As shown in FIG. 6, when the input-output restriction control starts, first, the control device 100 executes the process of step S201. In step S201, the control device 100 acquires, as a start temperature, the temperature of the battery 77 at the current time, that is, as the temperature at the time point when the electrified tractor 10 starts the work in the farm field. Specifically, the control device 100 acquires the temperature T1 of the battery 77 from the battery temperature sensor 62. The control device 100 stores the temperature T1 as the start temperature. Thereafter, the process in the control device 100 transitions to step S202.

In step S202, the control device 100 acquires the work content that is executed by the electrified tractor 10 from now, similarly to the above-described step S12. Further, in step S202, the control device 100 receives the weather information WI, similarly to the above-described step S12. The control device 100 determines whether or not precipitation occurs, based on the received weather information WI. Step S202 is a work determination process of determining what of a plurality of previously set work contents is the work content that is performed by the working machine 20. Thereafter, the process in the control device 100 transitions to step S203.

In step S203, the control device 100 refers to the electric power amount map M corresponding to the weather information WI, similarly to step S16. That is, the control device 100 refers to the first electric power amount map M1 or the second electric power amount map M2. Then, in the electric power amount map M that is referred to, the control device 100 refers to the estimated electric power consumption corresponding to the acquired work content. Thereafter, the process in the control device 100 transitions to step S204.

In step S204, the control device 100 acquires an estimated rise temperature corresponding to the estimated electric power consumption acquired in step S203. The control device 100 stores the estimated rise temperature that is a temperature by which the temperature of the battery 77 is predicted to rise when the estimated electric power consumption is consumed in the battery 77. The control device 100 stores a map indicating the relation between the estimated electric power consumption and the estimated rise temperature. In the map, the correspondence is performed such that the estimated rise temperature is larger as the estimated electric power consumption is larger. Then, the control device 100 acquires the estimated rise temperature by applying the estimated electric power consumption acquired in step S203 to the map. After the acquisition of the estimated rise temperature, the process in the control device 100 transitions to step S205.

In step S205, the control device 100 calculates an estimated temperature that is the temperature of the battery 77 when it is assumed that the electrified tractor 10 has finished the work in the farm field. Specifically, the control device 100 calculates the estimated temperature by adding the estimated rise temperature to the start temperature. The process of step S205 is a temperature calculation process. Thereafter, the process in the control device 100 transitions to step S206.

In step S206, the control device 100 determines whether the estimated temperature calculated in the temperature calculation process is higher than a prescribed set second prescribed temperature Y. The second prescribed temperature Y is set as the upper limit of the temperature at which the battery 77 can function without an excessive output decrease. Further, the second prescribed temperature Y is set to a fixed value that is lower than a first prescribed temperature X described later. The control device 100 previously stores the second prescribed temperature Y.

In the case of the negative determination in step S206 (S206: NO), the input-output restriction control by the control device 100 ends. On the other hand, in the case of the positive determination in step S206 (S206: YES), the process in the control device 100 transitions to step S207.

In step S207, the control device 100 controls the first inverter 71 and the second inverter 72, such that the input-output electric power of the battery 77 is within a previously set prescribed electric power range. The prescribed electric power range is set similarly to the prescribed electric power range in the first embodiment. The process of step S206 and step S207 is a restriction process of controlling the first inverter 71 and the second inverter 72 such that the input-output electric power of the battery 77 is restricted within the prescribed electric power range when the state of the battery 77 satisfies a restriction condition. That is, the restriction condition is a condition that the estimated temperature is higher than the second prescribed temperature Y. Thereafter, the process in the control device 100 transitions to step S208.

In step S208, the control device 100 causes the display 80 to start the display of a message. The content of the message includes information indicating that the temperature of the battery 77 is predicted to rise. Thereafter, the process of the control device 100 transitions to step S209.

In step S209, the control device 100 determines whether the estimated temperature calculated in the temperature calculation process is higher than the first prescribed temperature X, which is previously set. The first prescribed temperature X is set as a temperature at which an irreversible deterioration can occur in the battery 77. The first prescribed temperature X is a fixed value that is previously set by experiments or the like.

In the case of the positive determination in step S209 (S209: YES), the process in the control device 100 transitions to step S211. In the case of the negative determination in step S209 (S209: NO), the process in the control device 100 transitions to step S210.

In step S210, the control device 100 expands the prescribed electric power range provided in the restriction process. Specifically, the control device 100 sets the prescribed electric power range to the same electric power range as the electric power range at the time of the normal traveling before the prescribed electric power range is provided. That is, although the restriction process is being executed, the control device 100 temporarily relaxes the restriction, to change the electric power range that can be input and output by the battery 77 to the same electric power range as the electric power range at the time of the normal traveling. Namely, the process of step S210 is a relaxation process of expanding the prescribed electric power range. Thereafter, the process in the control device 100 transitions to step S211.

In step S211, the control device 100 determines whether a current temperature that is the temperature of the battery 77 at the current time is higher than the second prescribed temperature Y. Specifically, the control device 100 acquires the temperature T1 of the battery 77, similarly to the above-described step S201. Then, the control device 100 adopts the temperature T1 of the battery 77 acquired in step S211, as the current temperature, and determines the above determination by comparing the current temperature and the second prescribed temperature Y.

In the case of the negative determination in step S211 (S211: NO), the control device 100 executes the process of step S211 again. In the case of the positive determination in step S211 (S211: YES), the process in the control device 100 transitions to step S212.

In step S212, the control device 100 causes the display 80 to start the display of a message. The content of the message includes information indicating that there is a possibility that the working machine 20 stops. Thereafter, the process of the control device 100 transitions to step S213.

In step S213, the control device 100 determines whether the current temperature that is the temperature of the battery 77 at the current time is higher than the first prescribed temperature X. Specifically, the control device 100 acquires the temperature T1 of the battery 77 again, similarly to the above-described step S201. Then, the control device 100 adopts the temperature T1 of the battery 77 acquired in step S213, as the current temperature, and performs the above determination by comparing the current temperature and the first prescribed temperature X.

In the case of the negative determination in step S213 (S213: NO), the control device 100 executes the process of step S213 again. In the case of the positive determination in step S213 (S213: YES), the process in the control device 100 transitions to step S214.

In step S214, the control device 100 controls the second inverter 72 so as to stop the drive of the blades 21 in the working machine 20. That is, the control device 100 stops the output of the second electric motor 42 by controlling the second inverter 72. The process of step S214 is a forced stop process. Thereafter, the control device 100 ends a sequence of input-output restriction control.

Operation of Second Embodiment

In the second embodiment, suppose that it is determined that the estimated temperature at the time of the finish of the work is lower than the second prescribed temperature Y. In this case, the control device 100 restricts the input-output electric power to the prescribed electric power range, such that the temperature of the battery 77 does not rise rapidly in a short time. That is, in this situation, the traveling speed of the electrified tractor 10 is restricted, or the rotation speed of the PTO 25 is decreased.

Meanwhile, suppose that the estimated temperature is higher than the second prescribed temperature Y and is lower than the first prescribed temperature X. In this case, the control device 100 temporarily relaxes the restriction, to change the electric power range that can be input and output by the battery 77 to the same electric power range as the electric power range at the time of the normal traveling. That is, the electrified tractor 10 can realize the same input and output as those at the time of the normal traveling.

Effect of Second Embodiment

Next, effects of the second embodiment will be described. The electrified tractor 10 in the second embodiment has the following effects, in addition to (1-8) to (1-10) in the first embodiment.

(2-1) In the above embodiment, in the case where the temperature of the battery 77 when the work is finished in the farm field is expected to be lower than the first prescribed temperature X, the control device 100 relaxes the input-output restriction of the battery 77 that is provided in the restriction process. Thereby, it is possible to restrain the occurrence of an affair in which the work needs to be continued in a state where the working efficiency of the electrified tractor 10 is low or an intended work cannot be performed. Even in this case, the temperature of the battery 77 when the work is finished is likely to be lower than the first prescribed temperature X, and therefore the battery 77 is avoided from becoming an overheat state.

(2-2) In the above embodiment, in the case where the estimated temperature is higher than the second prescribed temperature Y, the control device 100 executes the restriction process. With this configuration, it is possible to restrict the input and output of the electric power of the battery 77, with the rise in the temperature of the battery 77. Accordingly, it possible to restrain the battery 77 from becoming an overheat state.

(2-3) The degree of the rise in the temperature of the battery 77 differs depending on the work content that is performed by the working machine 20. In the above embodiment, the control device 100 calculates the estimated temperature depending on the work content determined in the work determination process. With this configuration, it is possible to reflect the work content that is performed by the working machine 20, in the calculation of the estimated temperature.

(2-4) In the above embodiment, in the case where the temperature of the battery 77 is higher than the first prescribed temperature X, the control device 100 forcedly stops the drive of the working machine 20. With this configuration, by stopping the drive of the working machine 20, it is possible to restrain the temperature of the battery 77 from excessively rising. Accordingly, it is possible to restrain the occurrence of a defect in the battery 77 due to the rise in the temperature of the battery 77.

Modification

The embodiments can be carried out while being modified as described below. The embodiments and the following modifications can be carried out while being combined with each other, as long as there is no technical inconsistency.

In the above embodiments, the electrified tractor 10 may include only one of the first electric motor 41 and the second electric motor 42. In the case where the number of electric motors included in the electrified tractor 10 is one, the electrified tractor 10 may include a mechanism that can split and transmit the output of the electric motor to the dynamic power transmission mechanism 19 and the PTO 25.

In the above embodiments, the electrified tractor 10 may include a drive source other than an electric motor, for example, an internal combustion engine. Even in the case of this example, the technology in the embodiments can be applied as long as at least one of the wheels 12 and the blades 21 of the working machine 20 is driven by an electric motor.

In the above embodiments, the control device 100 may decide the work content that is executed by the electrified tractor 10 from now, by determining the kind of the working machine 20. For example, when the control device 100 includes a mechanism that determines the kind of the working machine 20 attached to the PTO 25, the control device 100 can determine the working content that is executed from now, based on the kind of the working machine 20.

In the above embodiments, the electrified tractor 10 may prohibit the first electric motor 41 from generating electricity, in a period after the electrified tractor 10 enters the farm field from the outside of the farm field and before the electrified tractor 10 exits from the inside of the farm field to the outside of the farm field. The electrified tractor 10 often travels at a constant speed in the farm field, and therefore, even when the first electric motor 41 generates electricity, a large amount of electricity is not expected to be generated. Meanwhile, when the first electric motor 41 generates electricity, the speed of the electrified tractor 10 varies, so that the fuel efficiency can become low rather. In this modification, since the first electric motor 41 is prohibited from generating electricity in the farm field, it is hard for the above problem to occur.

In the above embodiments, the control device 100 may skip the estimated electric power consumption calculation control. In this case, the control device 100 may store the estimated electric power consumption previously evaluated by a simulation or the like, as a map or the like.

In the above embodiments, it is allowable to adopt a configuration in which the occupant can input the estimated electric power consumption using the display 80 or the like. Further, it is allowable to adopt a configuration in which the occupant can input a working time, a working area and the like using the display 80 or the like and in which the control device 100 can calculate the estimated electric power consumption based on the information.

In the above embodiments, the control device 100 may include a map other than the first electric power amount map M1 and the second electric power amount map M2. For example, the control device 100 may include a map for the time of snowfall. Further, the number of electric power amount maps M included in the control device 100 may be one. In the case where the number of electric power amount maps M included in the control device 100 is one, it is allowable to skip the process relevant to the acquisition of the weather information WI in each control.

In the above embodiments, the reflection rate c in the estimated electric power consumption calculation control may be a variable value, if the reflection rate $\alpha$ is a value that is larger than zero and is equal to or smaller than one. For example, the reflection rate $\alpha$ may be a value that linearly increases or decreases, as exemplified by a value that is larger as the difference between the electric power consumption and the estimated electric power consumption is smaller.

In the above embodiments, the control device 100 may skip the farm-field exit electric power calculation control. For example, the control device 100 may store the maximum electric power at the time of the exit from the farm field, as a fixed value that is previously set by a simulation or the like.

In the above embodiments, the electrified tractor 10 may exclude the display 80. In that case, the electrified tractor 10 may include an alarm device that gives an alarm using at least one of sound and light, as exemplified by an indicator lamp and a speaker. When the control device 100 includes a kind of alarm device, the control device 100 can execute the first notification process and the second notification process. Further, the electrified tractor 10 may exclude the alarm device.

In the above embodiments, the control device 100 may skip the first notification process and the second notification process.

In the above embodiments, the control device 100 does not need to set the electric power range that can be input and output by the battery 77 when the relaxation process is executed, to the same electric power range as the electric power range at the time of the normal traveling. For example, the electric power range when the relaxation process is executed may be decided to a range that is larger than the electric power range at the time of the restriction and is smaller than the electric power range at the time of the normal traveling.

In the above first embodiment, the restriction condition that is the condition for the execution of the restriction process is not limited to the example in the above embodiment. That is, it is allowable to determine whether to execute the restriction process based on a different parameter from the charging rate of the battery 77.

In the above first embodiment, the control device 100 may skip the charging rate calculation process. For example, as the estimated charging rate, a value input through the display 80 or the like by the occupant of the electrified tractor 10 may be applied, or a previously set fixed value may be applied.

In the above first embodiment, the first prescribed charging rate A does not need to be the lower limit of the charging rate at which the maximum exit electric power learning value can be output. For example, the first prescribed charging rate A may be set as the lower limit of the charging rate at which the battery 77 is not in the over discharge state.

In the above first embodiment, the control device 100 may skip the forced stop process. That is, the control device 100 may continue to drive the blades 21 of the working machine 20, even when the charging rate of the battery 77 is lower than the first prescribed charging rate A. However, in the case of skipping the forced stop process, from a standpoint of the protection of the battery 77, it is preferable to decrease the output of the working machine 20, when the charging rate of the battery 77 is lower than the first prescribed charging rate A.

In the above second embodiment, the restriction condition that is the condition for the execution of the restriction process is not limited to the example in the above embodiment. That is, it is allowable to determine whether to execute the restriction process based on a different parameter from the temperature of the battery 77.

In the above second embodiment, the control device 100 may skip the temperature calculation process. For example, as the estimated temperature, a value input through the display 80 or the like by the occupant of the electrified tractor 10 may be applied, or a previously set fixed value may be applied.

In the above second embodiment, the control device 100 may skip the forced stop process. That is, the control device 100 may continue to drive the working machine 20, even when the temperature of the battery 77 is higher than the first prescribed temperature X. However, in the case of skipping the forced stop process, from a standpoint of the protection of the battery 77, it is preferable to decrease the output of the working machine 20, when the temperature of the battery 77 is higher than the first prescribed temperature X.

In the electrified tractor disclosed in JP 2014-143965 A, there is fear that the charging rate of the battery excessively decreases while the electrified tractor is working in the farm field. If the charging rate of the battery decreases, there is fear that the electrified tractor cannot exit from the farm field or the electrified tractor stops in the farm field. From a standpoint of the solution of this problem, the above embodiments only needs to include the forced stop process, and may exclude the restriction process, the charging rate calculation process and the relaxation process. When the above forced stop process can be executed, in the case where the charging rate of the battery is lower than the first prescribed charging rate, it is possible to stop the drive of the rotating body and to use the charging capacity of the battery for traveling. Accordingly, it is possible to reduce a risk that the operation of the electrified tractor stops in the farm field or the electrified tractor cannot exit from the farm field.

A technical idea that can be derived from the above embodiments and modifications is described below.

An electrified tractor including: a vehicle body capable of being joined to a working machine; a working machine including a rotating body; a wheel for traveling, the wheel being attached to the vehicle body: an electric motor configured to drive at least one of the wheel and the rotating body; a battery configured to accumulate electric power that is supplied to the electric motor; an inverter configured to control input-output electric power of the battery; and a control device configured to control the inverter, in which: the electric motor drives at least the rotating body; and when the charging rate of the battery is lower than a previously set first prescribed charging rate, the control device executes a forced stop process of controlling the inverter so as to stop the drive of the rotating body.

What is claimed is:

1. An electrified tractor comprising:
a vehicle body capable of being joined to a working machine;
a working machine including a rotating body;
a wheel for traveling, the wheel being attached to the vehicle body:
an electric motor configured to drive at least one of the wheel and the rotating body;
a battery configured to accumulate electric power that is supplied to the electric motor;
an inverter configured to control input-output electric power of the battery; and
a control device configured to control the inverter, wherein:
the control device is configured to
execute a charging rate calculation process of calculating an estimated charging rate defined as a charging rate of the battery assumed when a work is finished in a previously set farm field;
in response to the estimated charging rate calculated in the charging rate calculation process being lower than a second prescribed charging rate, execute a restriction process of controlling the inverter such that the input-output electric power of the battery is restricted within a previously set prescribed electric power range; and
in response to (i) the restriction process being executed and (ii) the estimated charging rate calculated in the charging rate calculation process being higher than a first prescribed charging rate, execute a relaxation process of relaxing the input-output electric power of the battery restricted in the restriction process and expanding the prescribed electric power range, wherein
the second prescribed charging rate is set to a higher value than the first prescribed charging rate.

2. The electrified tractor according to claim 1, wherein:
the control device further executes a work determination process of determining what of a plurality of previously set work contents is a work content that is performed by the work machine; and
in the charging rate calculation process, the control device calculates the estimated charging rate depending on the work content determined in the work determination process.

3. The electrified tractor according to claim 1, wherein:
the electric motor drives at least the rotating body; and
when the charging rate of the battery is lower than the first prescribed charging rate, the control device further executes a forced stop process of controlling the inverter so as to stop the drive of the rotating body.

4. The electrified tractor according to claim 1, further comprising an alarm device configured to give an alarm using at least one of sound and light, wherein
after the execution of the restriction process, the control device further executes a first notification process of causing the alarm device to give notice of information indicating that the charging rate of the battery is predicted to decrease.

5. The electrified tractor according to claim 1, further comprising an alarm device configured to give an alarm using at least one of sound and light, wherein
when the charging rate of the battery is lower than a second prescribed charging rate that is set to a higher value than the first prescribed charging rate, the control device further executes a second notification process of causing the alarm device to give notice of information indicating that there is a possibility that the work machine stops.

6. An electrified tractor comprising:
a vehicle body capable of being joined to a working machine;
a working machine including a rotating body;
a wheel for traveling, the wheel being attached to the vehicle body:
an electric motor configured to drive at least one of the wheel and the rotating body;
a battery configured to accumulate electric power that is supplied to the electric motor;
an inverter configured to control input-output electric power of the battery; and
a control device configured to control the inverter, wherein:
the control device is configured to
execute a temperature calculation process of calculating an estimated temperature defined as a temperature of the battery assumed when a work is finished in a previously set farm field;
in response to the estimated temperature calculated in the temperature calculation process being higher than a second prescribed temperature, execute a restriction process of controlling the inverter such that the input-output electric power of the battery is restricted within a previously set prescribed electric power range; and,
in response to (i) the restriction process being executed and (ii) the estimated temperature calculated in the temperature calculation process being lower than a first prescribed temperature, execute a relaxation process of relaxing the input-output electric power of the battery restricted in the restriction process and expanding the prescribed electric power range, wherein
the second prescribed temperature is set to a lower value than the first prescribed temperature.

7. The electrified tractor according to claim 6, wherein:
the control device further executes a work determination process of determining what of a plurality of previously set work contents is a work content that is performed by the work machine; and
in the temperature calculation process, the control device calculates the estimated temperature depending on the work content determined in the work determination process.

8. The electrified tractor according to claim 6, wherein:
the electric motor drives at least the rotating body; and
when the temperature of the battery is higher than the first prescribed temperature, the control device further executes a forced stop process of controlling the inverter so as to stop the drive of the rotating body.

* * * * *